United States Patent
Vergara et al.

(10) Patent No.: US 10,985,567 B1
(45) Date of Patent: Apr. 20, 2021

(54) METHODS AND SYSTEMS FOR PROVIDING ELECTRIC ENERGY PRODUCTION AND STORAGE

(71) Applicant: Zola Electric Labs Inc., San Francisco, CA (US)

(72) Inventors: Claudio Vergara, San Francisco, CA (US); Xavier Helgesen, San Francisco, CA (US); Joshua Pierce, Chico, CA (US)

(73) Assignee: Zola Electric Labs Inc., San Francisco, CA (US)

( * ) Notice: Subject to any disclaimer, the term of this patent is extended or adjusted under 35 U.S.C. 154(b) by 0 days.

(21) Appl. No.: 17/083,294

(22) Filed: Oct. 29, 2020

Related U.S. Application Data

(60) Provisional application No. 62/934,513, filed on Nov. 12, 2019.

(51) Int. Cl.
*H02J 3/38* (2006.01)
*H02J 13/00* (2006.01)
*H02J 9/06* (2006.01)

(52) U.S. Cl.
CPC .............. *H02J 3/381* (2013.01); *H02J 9/06* (2013.01); *H02J 13/00002* (2020.01); *H02J 13/00036* (2020.01); *H02J 2300/24* (2020.01); *H02J 2310/12* (2020.01)

(58) Field of Classification Search
CPC ............. H02J 3/381; H02J 13/00036; H02J 13/00002; H02J 9/06; H02J 2300/24; H02J 2310/12
See application file for complete search history.

(56) References Cited

U.S. PATENT DOCUMENTS

| | | | |
|---|---|---|---|
| 7,478,070 B2 | 1/2009 | Fukui et al. | |
| 9,041,348 B2 | 5/2015 | Murawaka | |
| 9,306,393 B2 * | 4/2016 | Jung | H02J 3/00 |
| 9,369,074 B2 | 6/2016 | Tanaka et al. | |
| 9,465,398 B2 | 10/2016 | Forbes, Jr. | |
| 9,568,208 B2 | 2/2017 | West et al. | |
| 10,618,420 B2 | 4/2020 | Kondo | |
| 10,838,474 B2 | 11/2020 | Niwa | |

* cited by examiner

*Primary Examiner* — Robert L Deberadinis
(74) *Attorney, Agent, or Firm* — Kanika Radhakrishnan; Evergreen Valley Law Group

(57) ABSTRACT

The present disclosure provides a method and a system for the production and storage of electric energy. The method performed by a central control unit includes providing the power supply to a customer location from an electrical power supply system. The method further includes determining whether power supply is available from a remote power system. The availability of the power supply is determined based on determining whether electric power is being exchanged with an interface electrically connecting a gateway AC battery of the electrical power supply system to the remote power system. The method further includes charging and discharging of the AC batteries using power supply that is being exchanged between the gateway AC battery and the remote power system for providing power supply from the gateway AC battery to the customer location, and from photovoltaic panels equipped with AC/DC converters.

20 Claims, 10 Drawing Sheets

METHODS AND SYSTEMS FOR PROVIDING ELECTRIC ENERGY PRODUCTION AND STORAGE

TECHNICAL FIELD

The present disclosure relates to an integrated electrical power supply system, and more particularly relates to the electrical power supply system for providing electric energy storage and power production to a customer location.

BACKGROUND

Electricity is one of the most important requirements in today's life as our day to day activities, such as cooking, cleaning, reading, transportation, etc., depend on it. So, maintaining a continuous supply of electricity is an essential necessity as it plays a huge role in our everyday lives. Electricity is supplied to our homes using electricity supply systems that are responsible for the transmission and distribution of electricity from electricity generation power plants.

Currently, alternating current (AC) electricity supply systems are used for transmission and distribution of electricity produced either by the electricity generation power plants or by the distributed energy resources (DER). The AC electricity supply systems for off-grid and weak-grid applications include multiple components, such as batteries, inverters, photovoltaic (PV) panels, etc., to meet the electricity requirement of a particular location. Most of the components that are used in the AC electricity supply systems are usually difficult to install and/or ill-equipped to facilitate the expansion of the electricity supply systems. Further, the installation of multiple batteries in the AC electricity supply systems and the operation of the multiple batteries autonomously in a balanced manner often become difficult without a single grid-forming inverter. Typically, a single inverter is used in the AC electricity supply systems for facilitating the autonomous operation of the batteries. However, the use of a single inverter also results in a single point of failure in a power loss or a grid shutdown scenario.

Therefore, there is a need for techniques that can overcome one or more limitations stated above in addition to providing other technical advantages.

SUMMARY

Various embodiments of the present disclosure provide a method and a system for providing electric energy production and storage.

In an embodiment, an electrical power supply system for providing electric energy production and storage is disclosed. The electrical power supply system includes a gateway alternating current (AC) battery that further includes a central control unit. The central control unit is configured to provide the power supply to a customer location from the electrical power supply system. The central control unit is further configured to determine whether the power supply is available from a remote power system. The availability of the power supply is determined based on determining whether electric power is being exchanged with an interface electrically connecting the gateway AC battery to the remote power system. The central control unit is further configured to provide the power supply from at least one of the gateway AC battery of the electrical power supply system to the customer location and the electrical power supply system to the remote power system based at least on the power supply that is being exchanged between the gateway AC battery and the remote power system, upon determining the availability of the power supply from the remote power system. Providing the power supply to at least one of the customer location and the remote power system results in charging and discharging of the gateway AC battery respectively.

In another embodiment, a method performed by a central control unit of an electrical power supply system for providing electric energy production and storage is disclosed. The method includes providing the power supply to a customer location from the electrical power supply system. The method includes determining whether the power supply is available from a remote power system. The availability of the power supply is determined based on determining whether electric power is being exchanged with an interface electrically connecting a gateway AC battery of the electrical power supply system to the remote power system. The method further includes providing the power supply from at least one of the gateway AC battery of the electrical power supply system to the customer location and the electrical power supply system to the remote power system based at least on the power supply that is being exchanged between the gateway AC battery and the remote power system. Providing the power supply to at least one of the customer location and the remote power system results in charging and discharging of the gateway AC battery respectively.

In yet another embodiment, an electrical power supply system for providing electric energy production and storage is disclosed. The electrical power supply system includes a gateway alternating current (AC) battery, at least one expansion AC battery, an interface, an expansion port and a central control unit. The interface electrically connects the gateway AC battery to a remote power system. The expansion port is provided in the gateway AC battery for electrically connecting the gateway AC battery, the at least one expansion AC battery and a plurality of photovoltaic (PV) panels. The central control unit is provided in the gateway AC battery and is configured to provide the power supply to a customer location from the electrical power supply system. The electrical power supply system provides the power supply to the customer location using at least one of PV energy generated by the plurality of PV panels and energy stored in the gateway AC battery and the at least one expansion AC battery. The central control unit is configured to determine whether the power supply is available from the remote power system. The availability of the power supply is determined based on determining whether electric power is being exchanged with the interface. The central control unit is further configured to provide the power supply from at least one of the electrical power supply system to the customer location and the electrical power supply system to the remote power system based at least on the power supply that is being exchanged between the electrical power supply system and the remote power system, upon determining the availability of the power supply from the remote power system. Providing the power supply to at least one of the customer location and the remote power system results in charging and discharging of the gateway AC battery and the at least one expansion AC battery of the electrical power supply system respectively.

BRIEF DESCRIPTION OF THE FIGURES

The following detailed description of illustrative embodiments is better understood when read in conjunction with the appended drawings. For the purpose of illustrating the present disclosure, exemplary constructions of the disclosure are shown in the drawings. However, the present disclosure is not limited to a specific device or a tool and instrumentalities disclosed herein. Moreover, those skilled in the art will understand that the drawings are not to scale. Wherever possible, like elements have been indicated by identical numbers.

Figure 1:
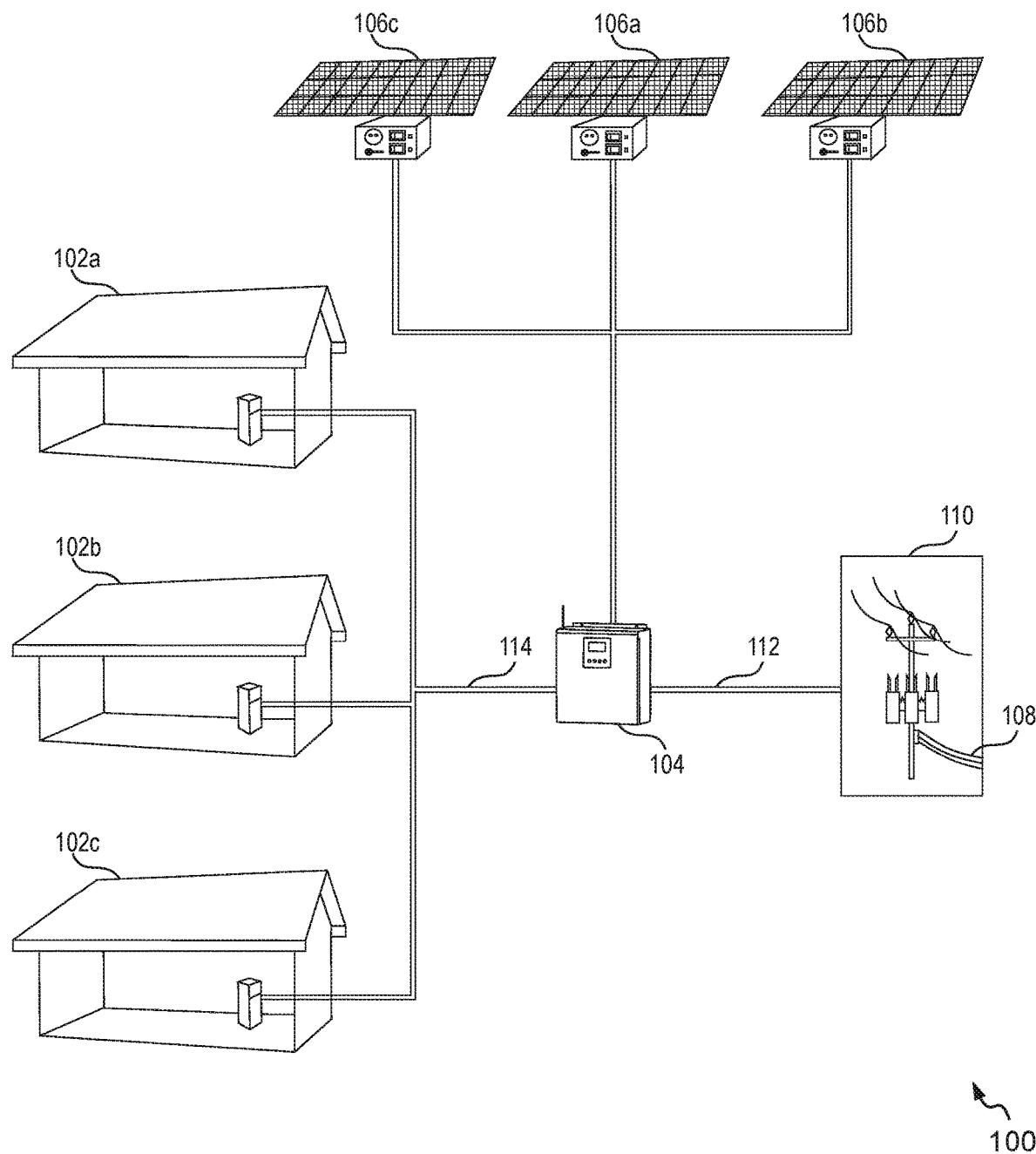
FIG. 1 is an example representation of an environment related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The terms "consumer", "customer" and "user" have been used interchangeably throughout the description, and they refer to any person, entity, or group that uses the power supply provided by the power supply companies.

The term "electrical power supply system" refers to an electrical network of one or more components deployed to supply, transfer and use electric power. The majority of the electrical power supply system(s) uses three-phase alternating current (AC) power for the large scale power transmission and distribution. Further, most of the customer locations (e.g., home) are generally provided with single-phase power supply, and the three-phase power supply is typically used in commercial/industrial situations and large homes.

Overview

Various embodiments of the present disclosure provide methods and systems for providing power supply to a customer location. In an embodiment, the system includes a gateway alternating current (AC) battery and an interface that electrically connects the gateway AC battery to a remote power system. In another embodiment, the system includes a gateway alternating current (AC) battery, at least one expansion AC battery, an expansion port provided in the gateway AC battery and an interface that electrically connects the gateway AC battery to the remote power system. The expansion port electrically connects the gateway AC battery, the at least one expansion AC battery, and a plurality of photovoltaic (PV) panels in a string. The electrical power supply system can be equipped at a customer location of a customer/user for supplying electric power to electrical outlets at the customer location.

In an embodiment, the gateway AC battery includes a central control unit configured to provide the power supply from the electrical power supply system to the customer location. For providing the power supply, the central control unit may be configured to determine whether the power supply is available from the remote power system. More specifically, the central control unit may be configured to determine whether electric power is being exchanged with the interface electrically connecting the gateway AC battery to the remote power system. If the power supply is determined to be available from the remote power system, the central control unit may be configured to charge the gateway AC battery using the power supply that is being exchanged between the gateway AC battery and the remote power system. The charged gateway AC battery may then be used for providing the power supply to the customer location. In some embodiments, the central control unit may provide the power supply to the customer location directly using the power supply that is being exchanged between the gateway AC battery and the remote power system. It should be noted that at least one AC-DC PCU of the gateway AC battery operates to maintain uninterrupted power supply from the gateway AC battery to the customer location In another embodiment, the gateway AC battery includes the central control unit configured to provide the power supply from the electrical power supply system to the customer location. For providing the power supply, the central control unit may be configured to determine whether the power supply is available from the remote power system. More specifically, the central control unit may be configured to determine whether electric power is being exchanged with the interface electrically connecting the gateway AC battery to the remote power system. If the power supply is determined to be available from the remote power system, the central control unit may be configured to charge the gateway AC battery and the at least one expansion AC battery using the power supply that is being exchanged between the gateway AC battery and the remote power system. The electrical power supply system may then provide the power supply to the customer location using at least one of PV energy generated by the plurality of PV panels and/or the energy stored in the gateway AC battery and the at least one expansion AC battery. It should be noted that in this scenario, at least one AC-DC PCU of the plurality of PV panels, the gateway AC battery and the at least one expansion AC battery operate to maintain uninterrupted power supply from the electrical power supply system to the customer location.

Although process steps, method steps, or the like in the disclosure may be described in sequential order, such processes and methods may be configured to work in alternate orders. In other words, any sequence or order of steps that may be described in this patent application does not, in and of itself, indicate a requirement that the steps need to be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, it further does not imply that the illustrated process or any of its steps are necessary to one or more of the invention (s), and does not imply that the illustrated process is preferred.

Various embodiments of methods and systems for providing electric energy production and storage are further described with reference to FIG. 1 to FIG. 9.

FIG. 1 is an example representation of an environment 100 related to at least some example embodiments of the present disclosure. The environment 100 depicts the distribution of power supply to one or more customer locations 102a, 102b, and 102c via an electrical power supply system 104 equipped near the customer locations 102a, 102b, and 102c. The customer locations 102a, 102b, and 102c may need power supply for powering electrical loads placed at customer locations 102a, 102b, and 102c, respectively. The customer locations 102a, 102b, and 102c may be homes, offices, industries, and the like. Further, the environment 100 includes power sources 106a, 106b, and 106c that are electrically connected in a string. The power sources 106a, 106b, and 106c can be installed near/at the customer locations 102a, 102b, and 102c or can be installed at a remote location. The power sources 106a to 106c are electrically coupled to the electrical power supply system 104. So, energy generated by the power sources 106a to 106c is provided to the electrical power supply system 104. The power sources 106a to 106c are exemplarily depicted to be solar panels and/or photovoltaic (PV) panels. Additionally or alternatively, the power sources 106a to 106c may include, but are not limited to, wind source, biogas source, low-power hydroelectricity, and the like.

The electrical power supply system 104 includes at least a gateway alternating current (AC) battery and optionally one or more expansion AC batteries. The batteries (gateway AC battery and optionally one or more expansion AC battery) are configured to store charges/energy and provide power supply to the customer locations 102a, 102b, and 102c. Further, the batteries form an integral component of the electrical power supply system 104 which is further explained in detail. The electrical power supply system 104 exchanges (either receive or deliver) power through an interface 112 to a remote power system. The interface 112 is configured to electrically connect the gateway AC battery of the electrical power supply system 104 to the remote power system, such as a power grid 110 using electricity transmission lines 108. Examples of the interface 112 include, but are not limited to, a mainstream distribution network, a synchronous generator, a standalone distribution network, or any other electrical power supply system connected to it.

The power grid 110 may provide different ranges of voltage supply such as a medium voltage or of any other voltage levels. The power grid 110 may be equipped with low voltage transformers for controlling the voltage levels to be delivered to the customer locations 102a, 102b, and 102c. The electric power is transferred to various distribution sites and customer sites, such as the electrical power supply system 104 via the interface 112. Upon receiving the electrical power, the electrical power supply system 104 provides the electrical power to the electrical loads present at the customer locations 102a, 102b, and 102c via an electric feeder 114 by utilizing the charged storage batteries of the electrical power supply system 104. The electrical power supply system 104 is configured to provide an uninterrupted power supply to customer locations 102a, 102b, and 102c either by using the PV energy generated by the power sources 106a, 106b and 106c or by using energy stored in the batteries. In some scenarios, the electrical power supply system 104 may use the electrical power exchanged with the power grid 110 via the interface 112 to provide an uninterrupted power supply to customer locations 102a, 102b, and 102c.

In an embodiment, the electrical power supply system 104 and the power sources 106a to 106c may be installed near the customer locations 102a to 102c for providing the uninterrupted power supply to the customer locations 102a to 102c. In this configuration, a power grid (e.g., the power grid 110) may be installed at vicinity of the customer locations 102a to 102c for providing power supply to the electrical power supply system 104. Further, the electrical power supply system 104 may be configured to provide uninterrupted power supply to the customer locations 102a to 102c based on the power supply from the power sources 106a to 106c and the charged storage batteries associated with the electrical power supply system 104.

The electric power supply to the electric feeder 114 (that distributes the electrical power to the customer locations 102a, 102b, and 102c) is controlled by a central control unit (see, 320 of FIG. 3A) of the gateway AC battery provided in the electrical power supply system 104. The central control unit is configured to provide the power supply to the customer location 102a to 102c from the electrical power supply system 104. The central control unit is further configured to determine the availability of the power supply from the remote power system (i.e., the power grid 110). The availability of the power supply is determined based on determining whether the electric power is being exchanged with the interface 112 electrically connecting the gateway AC battery to the power grid 110. If the power supply is determined to be available from the power grid 110, the central control unit is configured to monitor one or more parameters, such as voltage amplitude, frequency and phase angle of the power supply and provide power supply to the electrical power supply system 104 which further provides the power supply to the corresponding customer locations 102a, 102b, and 102c using the electric feeder 114. More specifically, the power supply from the power grid 110 is made available for exchanging power with the electrical power supply system 104, if each parameter of the one or more parameters is determined to be within a safe limit defined for the respective parameter. The power exchanged between the electrical power supply system 104 and the power grid 110 may be used by the electrical power supply system 104 for charging the batteries included in the electrical power supply system 104. The central control unit may facilitate an uninterrupted power supply to the electric feeder 114 from the electrical power supply system 104 either by using PV energy generated by power sources 106a, 106b and 106c or by using energy stored in the batteries. In some scenarios, the central control unit may use energy exchanged from the power grid 110 for facilitating uninterrupted power supply to the electric feeder 114. If any parameter of the one or more parameters is determined to be not within the safe limit defined for the respective parameter, the central control unit may stop the exchange of the power supply between the electrical power supply system 104 and the power grid 110.

In at least one example embodiment, the central control unit is configured to communicate with a control unit of the at least one expansion AC battery to collect telemetry (such as, state of charge (SoC) and temperature) associated with the at least one expansion AC battery. The central control unit may also be configured to determine the SoC and temperature of the gateway AC battery. The collected telemetry along with the temperature and SoC of the gateway AC battery is further utilized by the central control unit to determine the fitness of the at least one expansion AC battery. In an embodiment, the central control unit may communicate with the control unit of the at least one expansion AC battery using a wireless communication channel. In another embodiment, the central control unit may communicate with the control unit of the expansion AC battery using a power line communication. In particular, the fitness of a battery (i.e., the gateway AC battery and the expansion AC battery) depends on the SoC of the battery and the temperature condition of the battery. Additionally, or alternatively, the fitness of the battery may depend on other parameters such as but not limited to, charging and discharging condition of the battery, internal resistance, coulomb counting. If the state of charge is high and the temperature is low, the fitness of the battery will be considered high by the central control unit. Similarly, if the temperature of the battery is found to be high even though the state of charge is high, the fitness of the battery will be considered low. The central control unit is also configured to charge the gateway AC battery and the expansion AC battery based on the fitness of the gateway AC battery and the expansion AC battery, respectively. If the fitness of the gateway AC battery and the expansion AC battery is found to be high, the central control unit may charge the gateway AC battery and the expansion AC battery, otherwise, the central control unit may wait for some time till the fitness of each AC battery comes under the considerable limit for charging the gateway AC battery and the expansion AC battery.

Further, the central control unit is configured to manage a plurality of set points that are defined to manage the amount of electrical power that is to be exchanged with the power grid 110. If enough electrical power supply is not exchanged from the power grid 110, a problem associated with insufficient power supply can occur in case of power failure. Similarly, if too much electrical power is received from the power grid 110, the PV energy received from the power sources 106a, 106b and 106c may spill as there will not be enough space in the batteries for storing the PV energy produced by the power sources 106a, 106b and 106c. So, the central control unit manages the plurality of set points based on the condition of the batteries to improve techno-economic performance of the electrical power supply system 104.

Figure 2:
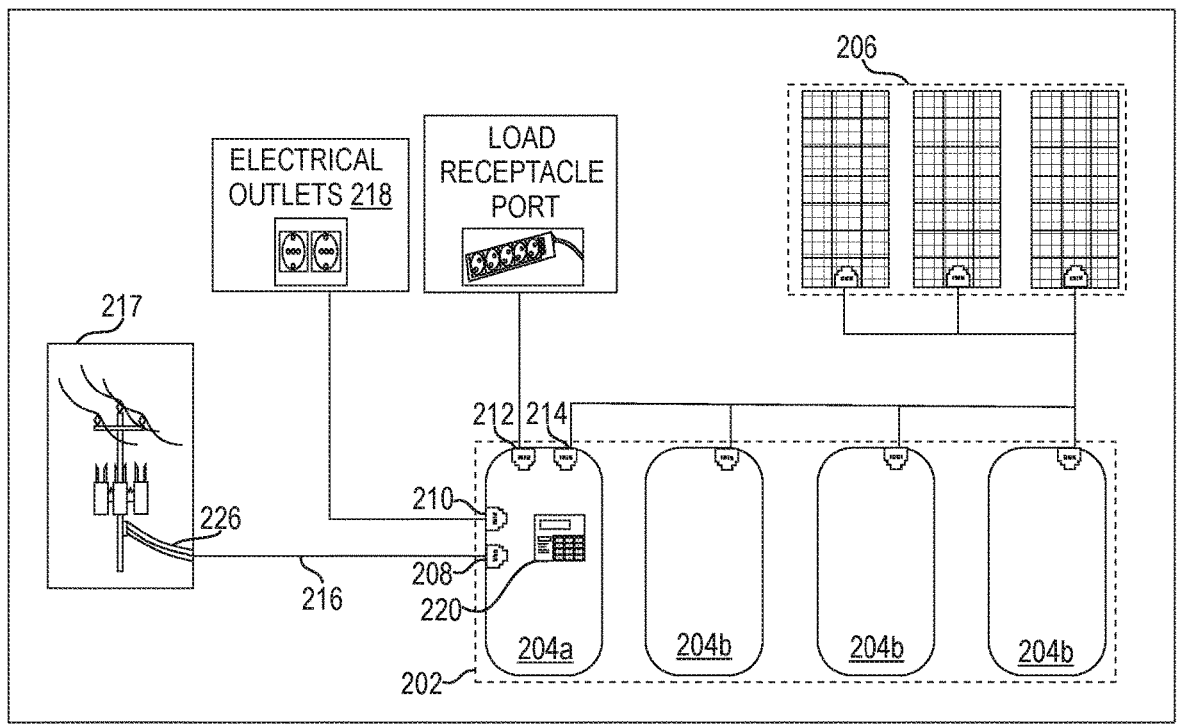
FIG. 2 is a schematic representation of a power distribution network including an electrical power supply system equipped at a customer location, in accordance with some example embodiments of the present disclosure.

FIG. 2 is a schematic representation of a power distribution network 200 at a customer location, in accordance with another example embodiment of the present disclosure. In an embodiment, the customer location may include a plurality of consumer sites, such as homes 102a to 102c shown in FIG. 1 or other buildings. As shown in FIG. 2, the power distribution network 200 includes an electrical power supply system 202 and a plurality of PV panels 206 associated with one or more micro inverters. The plurality of PV panels 206 acts as the power sources 106a, 106b and 106c as described with reference to FIG. 1. The number of PV panels, such as the PV panels 206 may be selected based on the energy requirements or load demands at the customer location.

The electrical power supply system 202 exchanges power through an interface 216 and delivers power to the customer locations 102a, 102b, and 102c. The electrical power supply system 202 and the interface 216 are an example of the electrical power supply system 104 and the interface 112, respectively, of FIG. 1.

The electrical power supply system 202 includes AC batteries 204a-204b, wherein the AC battery 204a is a gateway AC battery 204a and AC batteries 204b are expansion AC batteries (hereinafter collectively referred to as "expansion AC battery 204b"). In general, the AC batteries 204a-204b include a set of converters that creates AC current out of DC battery supplies. The AC batteries 204a-204b are configured to provide a bidirectional flow of AC current for power distribution at the customer location. In some scenarios, the electrical power supply system 202 may include only the gateway AC battery 204a for supplying power to the user locations 102a-102c.

The gateway AC battery 204a is configured with one or more input and output ports, such as a power exchanging port 208, a load terminal port 210, a load receptacle port 212, and an expansion port 214 for exchanging power i.e. to either receive or to deliver the electric power. The power exchanging port 208 includes the interface 216 for electrically connecting the gateway AC battery 204a to a remote power system 217 via electricity transmission lines 226. The interface 216 including the backup generator may be configured to perform synchronizing operation in case the remote power system 217 is available for exchanging power.

Further, the load terminal port 210 of the gateway AC battery 204a is configured to supply power to electrical outlets 218 at the customer location. The load receptacle port 212 is configured to directly receive a plug of electrical appliances at the customer location through a power strip. The electrical outlets 218 and the electrical appliances plugged to the load receptacle port 212 are collectively referred to as electrical loads of the customer location. The expansion port 214 is configured to electrically connect the gateway AC battery 204a, the expansion AC battery 204b and the PV panels 206 respectively in a daisy chain configuration. The daisy chain configuration of the gateway AC battery 204a, the expansion AC battery 204b, and the PV panels 206 result in the formation of AC strings. In general, the daisy chain configuration corresponds to a wiring scheme used in a large scale power system in which multiple devices are wired together in sequence to form a full or single loop. Further, the expansion AC battery 204b is selected based on the load demands. As a result, the expansion AC battery 204b is electrically connected to the gateway AC battery 204a to provide power supply based on the energy requirements or load demands at the user location. In other words, the expansion AC battery 204b is utilized in the electrical power supply system 202 to either meet higher load demands or to increase the total run time of the electrical power supply system 202.

In an embodiment, the AC batteries 204a and 204b, and the PV panels 206 may be electrically connected in a bottom-up microgrid configuration (not shown in FIGS.). The AC strings formed due to electrical connection of the AC batteries 204a and 204b, and the PV panels 206 in the bottom-up microgrid configuration may provide power supply to one or more customer sites (such as the customer locations 102a to 102c). In this scenario, the power supply to the customer locations 102a to 102c may be controlled by employing a meshed wireless network and a microgrid control unit (not shown in FIGS). The meshed wireless network and the micro grid control unit collectively operate to distribute power in a controlled manner to the customer locations 102a-102c and to maintain stable and safe electrical operations.

In one form, the gateway AC battery 204a is electrically connected to the electricity transmission lines 226 via the interface 216 for exchanging power supply. The exchanged power supply can be used for charging the gateway AC battery 204. In an embodiment, the exchanged power supply can also be used to directly provide power supply to the electrical outlets, such as the electrical outlets 218 of a customer location (e.g., the customer location 102a). In another form, the PV panels 206 are electrically connected to the AC batteries 204a and 204b directly to provide the power supply to the electrical outlets 218 in diverse cases which are explained in detail in further paragraphs. The gateway AC battery 204a and the expansion AC battery 204b are connected to a local distribution network and/or a local bus bar for distributing AC power supply received from at least the electricity transmission lines 226 and the PV panels 206. Further, the gateway AC battery 204a includes a communication interface 220 that can be used by a user for communication purposes. The communication purpose can be a communication of software update, checking of telemetry associated with batteries, etc. In one embodiment, the gateway AC battery 204a may include a display screen configured to display the energy exchanged data from the electricity transmission lines 226.

The gateway AC battery 204a further includes a central control unit configured to control the power supply to the electrical outlets 218 and operating conditions of the expansion AC battery 204b. In other words, the gateway AC battery 204a includes the central control unit configured to distribute the energy stored in the AC batteries 204a and 204b and to store the energy/power exchanged with the electricity transmission lines 226 and the power generated by the PV panels 206 to maximize the utilization of PV energy to maintain an uninterrupted power supply to the customer location. Further, the operations performed by the central control unit of the gateway AC battery 204a are herein described in detail with reference to FIGS. 3A-3B.

Figure 3A:
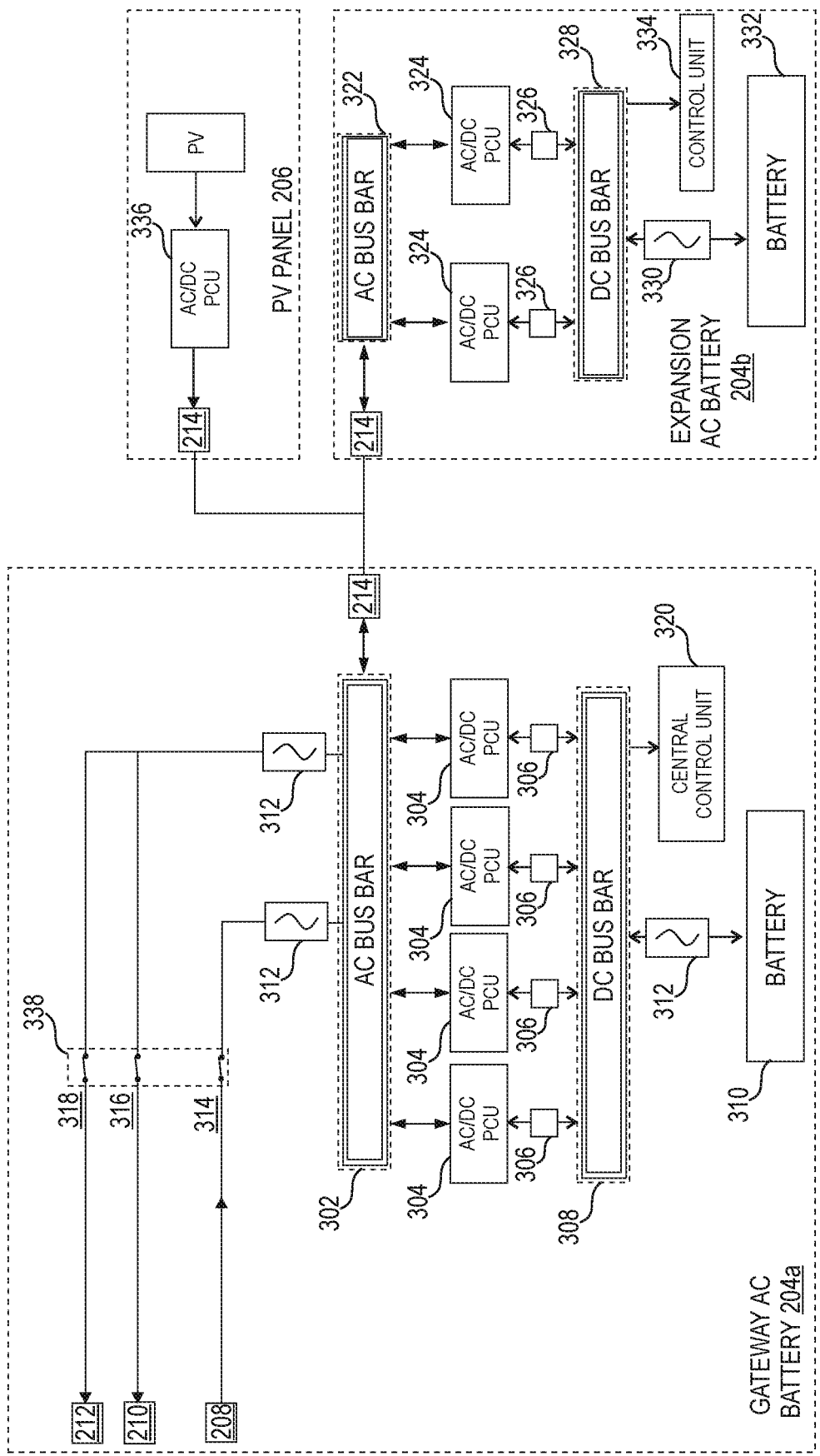
FIGS. 3A and 3B represent control operations performed by a central control unit of a gateway AC battery to automatically control the power supply from the electrical power supply system of FIG. 2, in accordance with an example embodiment of the present disclosure.
Figure 3B:
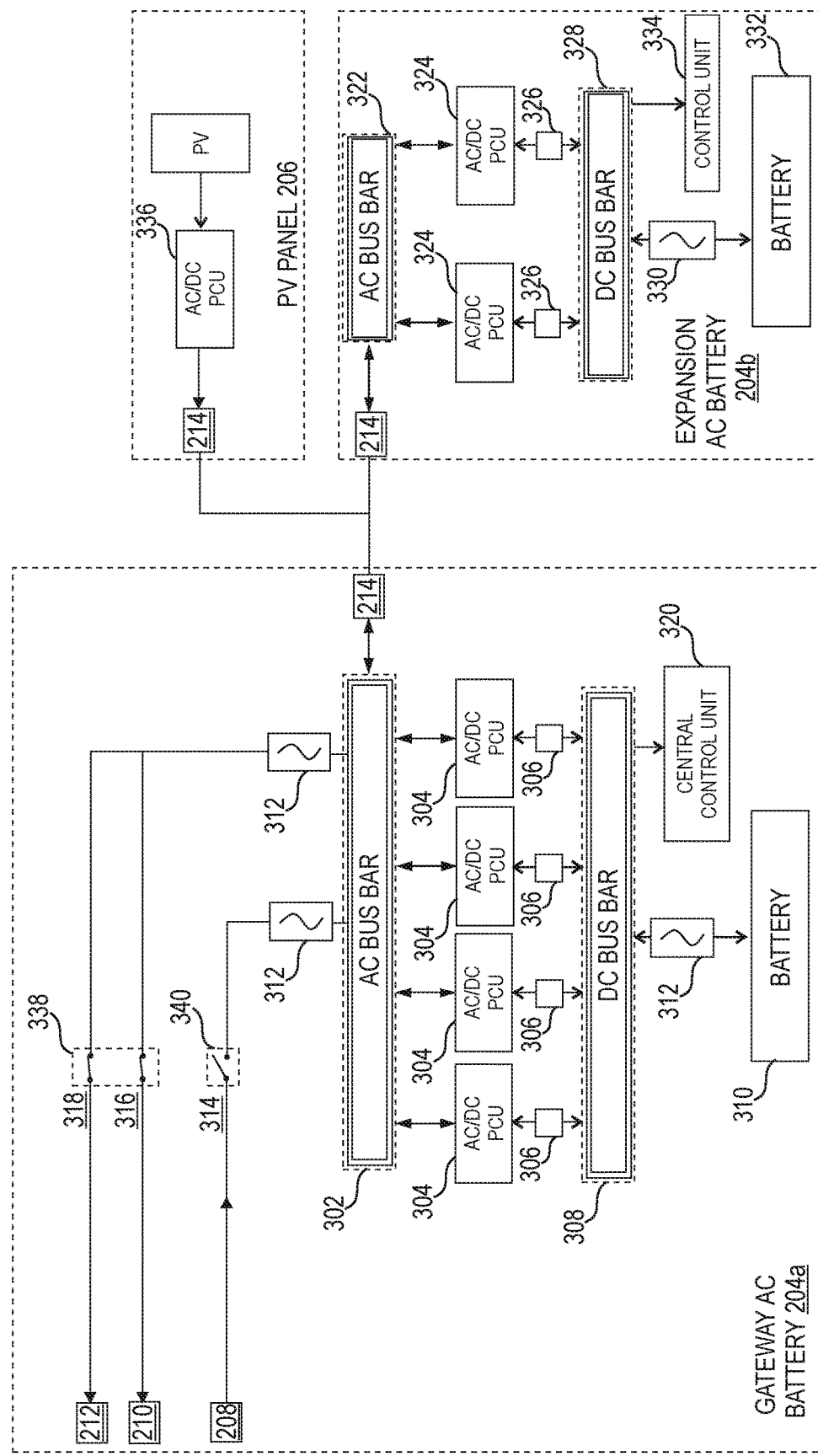

FIGS. 3A and 3B represent control operations performed by a central control unit to automatically control the power supply from an electrical power supply system, such as the electrical power supply system 202 of FIG. 2, in accordance with an example embodiment of the present disclosure.

As shown in FIG. 3A, a schematic representation of the internal architecture of the electrical power supply system 202 of FIG. 2 is illustrated. More specifically, the internal architecture of the gateway AC battery 204a, the expansion AC batteries 204b and a power source, such as the PV panels 206 is depicted. For illustrative purposes, the internal architecture of only one of the expansion AC battery 204b is shown and described herein.

The internal architecture of the gateway AC battery 204a includes an AC bus bar 302 electrically connected to at least one AC-DC power conditioning units (PCU) 304 (hereinafter referred to as 'AC-DC PCU 304'). The AC bus bar 302 corresponds to a local AC bus bar or a load bus that distributes power to the electrical outlets 218 present in the customer location. The AC bus bar 302 may be selected from at least one current conducting material such as, but not limited to, copper, brass, and the like. In an embodiment, the AC bus bar 302 may be plated with a metallic material to increase electrical conductivity.

Further, each of the AC-DC PCUs 304 is electrically connected to a switching device 306 that is further electrically connected to a DC bus bar 308. Each of the AC-DC PCU 304 communicates with the DC bus bar 308 via the switching device 306. It should be noted that the AC-DC PCU 304 is an example of bidirectional AC-DC converters/invertors that are configured to convert power from either AC to DC or DC to AC based on feasibility and requirements. Further, four AC-DC PCUs 304 in the gateway AC battery 204a are merely illustrative, and they can be in any other number depending upon feasibility and requirement. The switching device 306, electrically connected to each of the AC-DC PCUs 304 and the DC bus bar 308, is configured to switch the power supply either to AC or DC based on the load demands. For example, the switching device 306 may be an electronic switching device such as, but not limited to, a solid state switch. The electronic switching device includes one or more electronic elements such as, silicon controlled rectifiers (SCR) for switching to DC as per requirements of the loads. In an embodiment, the switching device 306 may be selected to be one of an electromechanical switching device as per design feasibility and requirements.

Further, a battery 310 is electrically connected to the DC bus bar 308 through an electrical safety device 312. More specifically, the electrical safety device 312, electrically connected between the DC bus bar 308 and the battery 310, may be configured to protect the battery 310 in faulty conditions. The battery 310 may be a DC battery such as, but not limited to, a lithium iron phosphate (LiFePo) battery, a Lithium-ion battery, Lithium polymer (LiPo) battery, and the like.

The gateway AC battery 204a further includes a circuit breaker 314. The circuit breaker 314 is electrically connected between the power exchanging port 208 and the AC bus bar 302. The circuit breaker 314 is configured to separate the AC bus bar 302 from the external power distribution network, such as a remote power system 217. Further, an electrical safety device, such as the electrical safety device 312 is electrically connected between the AC bus bar 302 and the circuit breaker 314. The circuit breaker 314 may be an electromechanical non-latching contactor or a MID circuit breaker in a normally open (NO) configuration. The NO configuration of the circuit breaker 314 enables automatic reset operation by an internal spring mechanism, based on the power supply to a coil of the circuit breaker 314. For instance, the operating time and/or reset time of the circuit breaker 314 may be about 200 milliseconds (ms). In an embodiment, the circuit breaker 314 may operate in a normally-off configuration. Additionally, the gateway AC battery 204a may include circuit breakers 316 and 318 to control the power supply to the electrical outlets, such as the electrical outlets 218 and the electrical appliances respectively, at the customer location.

Further, the gateway AC battery 204a includes a central control unit 320 electrically connected to the DC bus bar 308. The central control unit 320 is configured to control the power supply from the electrical power supply system 202.

Further, the AC bus bar 302 of the gateway AC battery 204a is electrically connected to an AC bus bar 322 of the expansion AC battery 204b and to an AC-DC PCU 336 of one PV panel of the PV panels 206 through the expansion port 214. The AC-DC PCUs 336, electrically connected to the PV panels 206, corresponds to the internal architecture of one PV panel of the PV panels 206 and may be referred to as "AC PV module". It is evident, that the AC power from the expansion AC battery 204b is provided to the electrical outlets 218 through the electrical connection of the AC bus bar 302 to the AC bus bar 322.

The power supply from the remote power system 217 is received using the electricity transmission lines 226 via the interface 216 at the AC bus bar 302 to charge the battery 310 associated with the gateway AC battery 204a. It is understood that the battery 310 is configured to store DC charges. Therefore, the AC-DC PCU 304 is configured to convert the power supply (i.e., AC power) at the AC bus bar 302 to DC power. The DC power is received at the DC bus bar 308 for charging the battery 310 for providing power supply to the electrical loads. Further, in some scenarios, the power supply from the remote power system 217 can also be utilized to supply power to the electrical loads (i.e., electrical outlets 218 and electrical appliances) at the customer location. In one implementation, the AC power generated by the PV panels 206 is directly supplied to the customer location through the AC bus bar 302. Further, the power supply from the PV panels 206 may also be utilized to charge the battery 310.

Additionally, the DC bus bar 308 supplies the DC power to the central control unit 320 for powering one or more components of the central control unit 320. The central control unit 320 is configured to control the charging of the battery 310 based on the availability of power supply from the remote power system 217 i.e. power supply exchanged through the electricity transmission lines 226, and the PV panels 206. In an embodiment, the central control unit 320 may be configured to maximize the utilization of the power supply from the PV panels 206 by utilizing the electricity from the remote power system 217 at the low-cost condition. As a result, the payment amount in the electricity bill owed to a customer residing at a customer location (e.g., the customer location 102a) is reduced. Further, the central control unit 320 is configured to monitor power supply from the remote power system 217 and to operate the AC batteries 204a and 204b to provide power supply to the customer location which is explained in detail in further paragraphs.

The expansion AC battery 204b includes at least one AC-DC PCU 324, a switching device 326, a DC bus bar 328, an electrical safety device 330, a battery 332 and a control unit 334. For illustrative purpose, only two AC-DC PCUs 324 are illustrated in the internal architecture of the expansion AC battery 204b and they can be of any number. The internal architecture of the expansion AC battery 204b is similar to the internal architecture of the gateway AC battery 204a. Therefore, for the sake of brevity, the internal architecture of the expansion AC battery 204b i.e., the electrical connection between the one or more components of the expansion AC battery 204b is herein not described again in detail. The control unit 334 of each of the expansion AC battery 204b is communicably coupled to the central control unit 320 of the gateway AC battery 204a. Thus, charging of the battery 332 and power distribution from the expansion AC battery 204b are controlled by the central control unit 320, as explained above.

In an embodiment, the central control unit 320 is configured to determine whether the power supply is available from the remote power system 217. The availability of the power supply is determined based on determining whether electric power is being exchanged with the interface 216 electrically connecting the gateway AC battery 204a to the remote power system 217. The central control unit 320 is then configured to operate the circuit breakers 314, 316 and 318 to either a connected state (see, 338 of FIG. 3A) or a disconnected state (see, 340 of FIG. 3B). In some embodiments, the circuit breaker 314 is operated by the central control unit 320 for controlling power supply at the customer location (e.g., the customer locations 102a to 102c). The circuit breaker 314 is operated in the disconnected state or the connected state based on receiving a connect signal from the central control unit 320.

In one scenario, the central control unit 320 is configured to operate the circuit breaker 314 to the connected state (e.g., as shown in FIG. 3A) based on determining that power supply is available from the remote power system 217. More specifically, the central control unit 320 is configured to monitor one or more parameters, such as voltage amplitude, frequency and phase angle of the power supply that is being exchanged between the gateway AC battery and the remote power system 217 for continuing exchange of the power supply with the remote power system 217 if the power supply is determined to be available from the remote power system 217. Upon determining that each parameter of the one or more parameters are within a predefined threshold value or a safe limit defined for the respective parameter, the central control unit 320 transmits the connect signal to the circuit breaker 314. The connect signal operates the circuit breaker 314 to the connected state (see, 338 of FIG. 3A) to continue the exchange of power supply with the remote power system 217. The circuit breaker 314, when operated in the connected state, enables the electricity transmission lines 226 to supply power to the AC bus bar 302 to continue exchange of the power supply with the remote power system 217. In an embodiment, the power supplied to the AC bus bar 302 can be used for charging the batteries 310 and 332. In another embodiment, the power supplied to the AC bus bar 302 can be used for supplying power to customer locations.

In case, if any parameter of the one or more parameters are determined to be not within the predefined threshold value or the safe limit defined for the respective parameter, the central control unit 320 discontinues or stops sending the connect signal to the circuit breaker 314. The absence of the connect signal operates the circuit breaker 314 to the disconnected state from the connected state (e.g., as shown in FIG. 3B). The circuit breaker 314, when operated in the disconnected state, disables the electricity transmission lines 226 to supply power to the AC bus bar 302 for charging the batteries 310 and 332 as well as for supplying power to customer locations in some scenarios.

Further, the customer location is provided with power supply from the electrical power supply system 202 due to operation of the circuit breakers 316 and 318 in the connected state (see, 338 of FIGS. 3A and 3B). The energy stored in the AC batteries 204a and 204b of the electrical power supply system 202 or PV energy generated by the PV panels 206 is provided to the customer location by the electrical power supply system 202. The AC-DC PCUs 304 and 324 are operated for providing power (i.e., AC power) to the user location 106 from the charged storage batteries 310 and 332. In other words, the AC-DC PCUs 304 and 324 pick up the load instantaneously for providing power supply to the user location 106. In particular, the AC-DC PCUs 304 and 324 convert the DC power stored in the batteries 310 and 322 to the AC power for providing power supply to the user location 106.

Further, the AC-DC PCUs 304 and 324 are configured to synchronously perform frequency and voltage droop operation from the AC batteries 204a and 204b. The amount of active and reactive power exchanged by each of the AC-DC PCU 304 and 324 is biased from the central control unit 320. The biasing of the AC-DC PCU 304 and 324 is based on monitoring the load changes homogenously or the availability of electricity transmission lines 226 by the central control unit 320.

In an embodiment, the central control unit 320 of the gateway AC battery 204a is configured to communicate with the control unit 334 of the expansion AC battery 204b to determine fitness of battery 332. In an example embodiment, a wireless communication channel may be used for facilitating communication between the central control unit 320 and the control unit 334 of the expansion AC battery 204b. The wireless communication channel can be a meshed wireless network operating at 2.4 GHz band. The central control unit 320 may include a cellular Global System for Mobile Communications (GSM) radio for making a connection with the meshed wireless network. The cellular GSM radio may also enable remote monitoring, diagnostics, as well as periodic updates in software of the gateway AC battery 204a and the expansion AC battery 204b.

The central control unit 320 is further configured to charge the batteries 310 and 332 based at least on the fitness of the batteries 310 and 332 using at least one of the power supply received from the remote power system 217 and the PV energy obtained from the PV panels 206. The process of charging the batteries 310 and 332 is further explained in detail with reference to FIGS. 4A, 4B and 5.

In one embodiment, the customer location may not be equipped with the PV panels, such as the PV panels 206 and the at least one expansion battery 204. In this scenario, the batteries 310 may be charged by the power supply received from the remote power system 217 through the electricity transmission lines 226 as explained above. Further, in this scenario, the central control unit 320 is configured to provide the power supply to the customer location from the electrical power supply system 202 based at least on monitoring the power supply from the remote power system 217 via the interface 216 as described above.

Figure 4A:
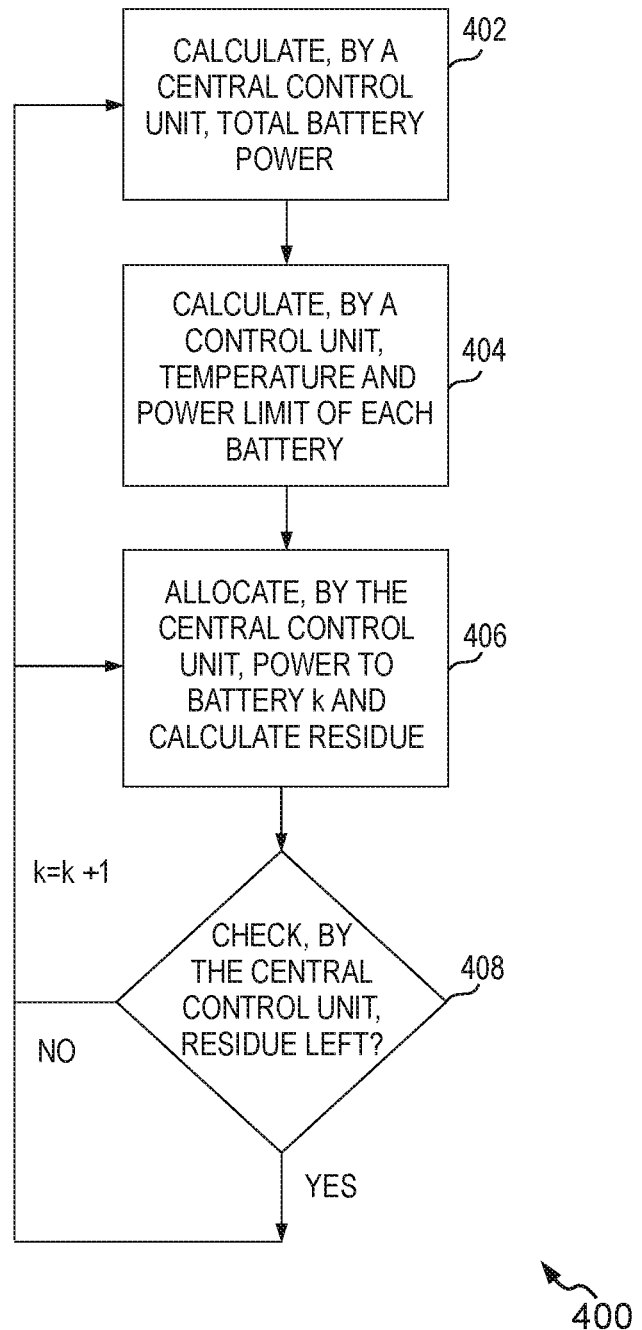
FIG. 4A is a flow diagram for charging an expansion AC battery, in accordance with an example embodiment of the present disclosure.

FIG. 4A is a flow diagram 400 for charging the AC batteries (e.g., the AC batteries 204a and 204b), in accordance with an example embodiment. The operations of the flow diagram 400 may be carried out by the central control unit 320 of the gateway AC battery 204a. The sequence of operations of the flow diagram 400 may not to be necessarily executed in the same order as they are presented. Further, one or more operations may be grouped together and performed in form of a single step, or one operation may have several sub-steps that may be performed in parallel or in sequential manner.

At operation 402, a total battery power is calculated by the central control unit. The central control unit 320 may calculate the total battery power by calculating difference between the sum of the power produced by the PV panels 206 and the power imported from the remote power system 217, and the power consumed by the electrical load at the customer location.

Total Power=(Power generated by the *PV* panels+Power imported from the grid)−Power consumed by electrical loads at the customer location At operation 404, temperature and state of charge (SoC) of each battery in the expansion AC battery 204b is calculated by the control unit 334 of the respective expansion AC battery 204b. The temperature and the storage capacity may be used by the central control unit 320 to determine fitness of each battery. The central control unit 320 may communicate with the control unit 334 of the expansion AC battery 204b to determine the temperature and the storage capacity of each battery. The storage capacity of the battery is defined in terms of state of charge (SoC) that is the level of charge of the battery relative to its capacity. The fitness of each AC battery in the AC batteries 204a and 204b depends on the temperature and the state of charge (SoC) of the respective AC battery. The fitness of the AC battery is considered high, if the SoC of that AC battery is high and the temperature is low. Similarly, the fitness of the AC battery will be considered low, if the temperature is high even though the SoC is high. The central control unit 320 may further rank expansion batteries in the expansion AC battery 204b in decreasing order of the fitness of the expansion batteries i.e. the expansion battery with highest fitness will be ranked first and the expansion battery with lowest fitness will be ranked last.

At operation 406, the power is allocated by the central control unit 320 to each battery i.e., the batteries 310 and 332 of the AC batteries 204a and 204b respectively, for charging. The central control unit 320 allocates the power to the AC batteries 204a and 204b based on the fitness of the corresponding AC battery. A residue is also calculated by the central control unit 320 after power allocation to each AC battery. For example, if the power is allocated to the battery 'k' of the electrical power supply system, the residue of the total battery power is calculated upon allocation of the power to the battery 'k'. The central control unit 320 allocates fractions of the total battery power (calculated at operation 402) to the AC batteries 204a and 204b sequentially based on the rank of the AC batteries. The central control unit 320 may allocate power (from the total battery power) first to the AC battery that is ranked first and then calculates the residue left after the allocation of the power to the AC battery that is ranked first.

At operation 408, the central control unit 320 is configured to check the residue of the total battery power upon allocating the power to each of the AC battery 204a and 204b. If the residue is left, the operation 406 is performed.

It is noted that the central control unit 320 is configured to allocate power to the AC batteries 204a and 204b till the residue of the total battery power is zero. In other words, the operation 406 is reiterated number of times till the residue of the total battery power is determined to zero. For example, if the power is allocated to the battery 'k' and there is residue of the total battery power, then the power is allocated to other batteries along with battery 'k' (referenced as k=k+1 in FIG. 4A) based on the residue value of the total battery power. The central control unit 320 waits for a predefined time (e.g., 1 minute) and then again starts providing power for charging the AC batteries 204a and 204b based on the current fitness of the each AC battery in the AC batteries 204a and 204b.

The monitoring of the fitness of the AC batteries 204a and 204b before charging at every instance, ensures safety and durability of the AC batteries 204a and 204b while extending the life of each AC battery in the AC batteries 204a and 204b. The flow diagram 400 may help in maximizing the power available to the customer location and prevents AC batteries 204a and 204b from aging differently due to heterogeneous temperature. The flow diagram 400 may also take into account both the aggregate state of charge of the string as well as the time of day in order to determine the need to charge from the remote power system 217. For example, at 11 am, a battery can accept an additional 2 kw/h of charge before being full, and whereas based on a forecasting service, the PV panels (e.g., the PV panels 206) will be able to contribute, discounting the expected load an additional load of 1 kW/h. In this case, a tie-line set point should result in not more than 1 kWh of power to be imported from the remote power system 217, as exceeding this value would result in some amount of PV energy (which is free) being wasted.

Figure 4B:
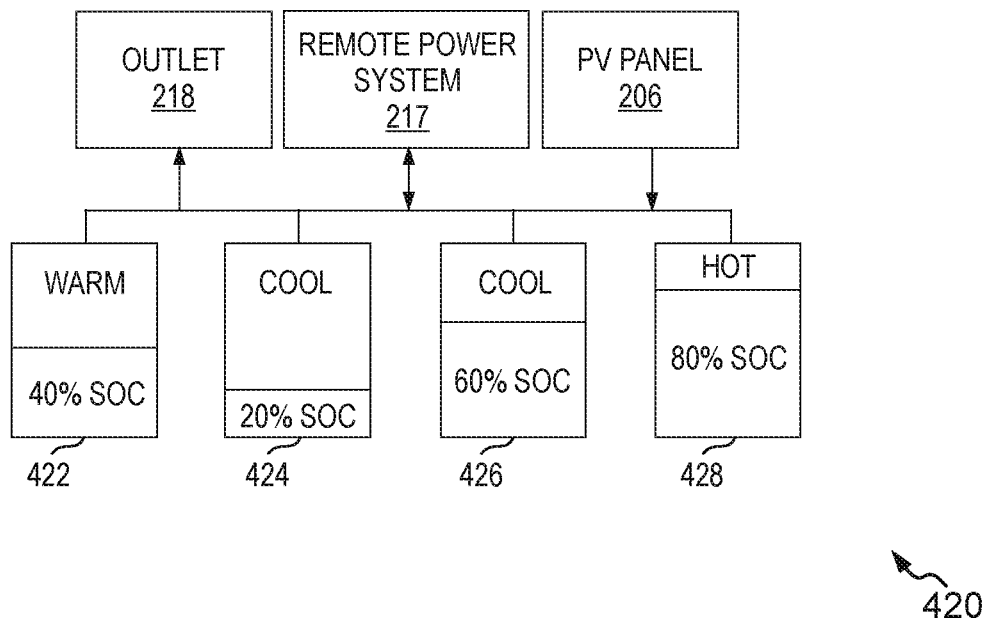
FIG. 4B is an example representation depicting ranking of multiple expansion AC batteries based on the fitness of each battery, in accordance with an example embodiment of the present disclosure.

FIG. 4B is an example representation 420 depicting ranking of multiple AC batteries 422-428 based on the fitness of each battery, in accordance with an example embodiment. The batteries 422-428 may be an example of the AC batteries 204a and 204b as described with reference to FIGS. 2 and 3A-3B.

As shown in FIG. 4B, a battery 426 has the highest fitness and is ranked first as the state of charge of the battery 426 is high i.e. 60 percent and the temperature is low (cool). A battery 424 is ranked second as the state of charge of the battery 424 is relatively low i.e. 20 percent but the temperature is also low (cool). A battery 422 is ranked third as the state of charge of the battery 422 is relatively high i.e. 40 percent but the temperature is relatively high (warm). A battery 428 is ranked last as even though the state of charge of the battery 428 is high, i.e. 80 percent, the temperature is at extreme. The charging of the battery 428 at such high temperature can damage the battery 428, hence the charging of the battery at this point of time will be avoided by the central control unit 320 to refrain from damaging the battery 428.

Figure 5:
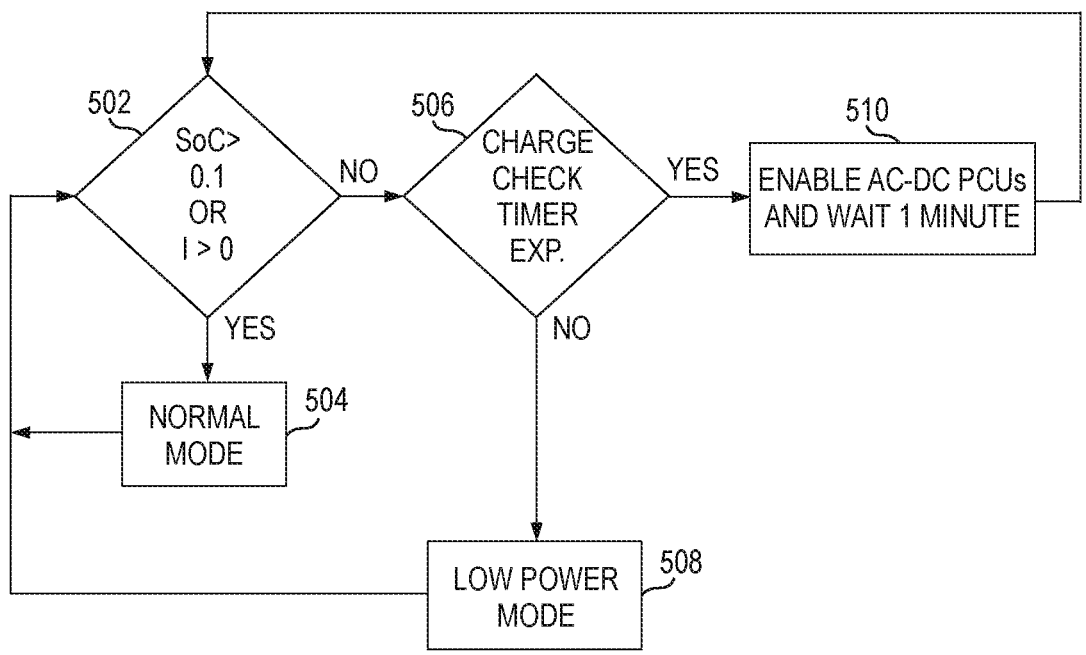
FIG. 5 is a flow diagram for determining performance of a battery in a low power mode, in accordance with an example embodiment of the present disclosure.

FIG. 5 is a flow diagram 500 for determining performance of a battery (e.g., the AC batteries 204a and 204b) in a low power mode, in accordance with an example embodiment. The operations of the flow diagram 500 may be carried out by the central control unit 320 of the gateway AC battery 204a and the control unit 334 of the expansion AC battery 204b. The operations of the flow diagram 500 may help in protecting the battery (e.g., the batteries 204a and 204b) from over-discharge by periodically monitoring the low power behavior of the battery. The sequence of operations of the flow diagram 500 may not to be necessarily executed in the same order as they are presented. Further, one or more operations may be grouped together and performed in form of a single step, or one operation may have several sub-steps that may be performed in parallel or in sequential manner.

At operation 502, a state of charge (SoC) of the battery is checked to determine whether the SoC is within a specified range. For example, a minimum specified range of the SoC is defined as '0.1' and minimum range for the electric current associated with the battery is defined as '0'. If the SoC is within the specified range, the operation 504 is performed, otherwise operation 506 is performed. At operation 504, the battery is considered to be performing in a normal mode. In particular, the central control unit 320 determines the battery to be in a normal mode, if the SoC is determined to be greater than '0.1' and the electric current associated with the battery to be greater than '0'.

At operation 506, a timer for expiry of charge of the battery is checked. The timer for charge check determines the total run time of the battery during use or when connected to provide power supply. The control unit 334 of the expansion AC battery 204b does not have the ability to sense the AC voltage, thus resulting the AC-DC PCUs 304 and 324 to remain disconnected or prevent operation of the AC-DC PCUs 304 and 324 even in the low power mode. To that effect, the timer for charge check provides information related to the charge level of the battery and to turn on the inverters (e.g., the AC-DC PCUs 304 and 324) in the battery (i.e., the batteries 204a and 204b) for detecting the source of charge.

At operation 508, the battery is determined to be entering the low-power mode and then, the operation 502 is performed. The central control unit 320 and the control unit 334 determines the condition of the AC batteries 204a and 204b to be in lower power mode, if the timer for charge check of the battery expires. Thus, the expiry of timer determines the SoC associated with the battery is less than the specified range. In addition, the charge required for recharging the battery may be determined based on the time count of the timer. Further, charging of the batteries 204a and 204b is controlled by the conditions or power supply at the AC bus bar 302 and the commands received by the central control unit 320 as explained with reference to FIGS. 4A and 4B.

At operation 510, the central control unit 320 and the control unit 334 transmit the signal to the corresponding AC-DC PCUs (i.e., the AC-DC PCUs 304 and 324) of the AC batteries 204a and 204b respectively, and wait for one minute. The AC-DC PCUs 304 and 324 are connected based on closing the switches 306 and 326 of the gateway AC battery 204a and 204b respectively. The AC-DC PCUs 304 and 324 remains connected for 1 minute and checks for the condition of the batteries 204a and 204b respectively (i.e., the specified range mentioned in the operation 502) for every second throughout the time of 1 minute. The AC-DC PCUs 304 and 324 operate to recharge the battery (i.e., the batteries 310 and 332) by converting the AC power received from either the PV panels 206 or the electricity transmission lines 226 to DC power. The AC-DC PCUs 304 and 324 are disconnected or stop operating when the condition is determined to be within the specified range (the electric current associated with the battery is determined to be greater than '0'). Further, the operations 502-510 are reiterated until the battery is fully charged or the battery condition is determined to be in the normal mode. In an embodiment, the operations 502-510 are reiterated, if the SoC of the battery is greater than a threshold value (e.g., 10 percent).

Figure 6:
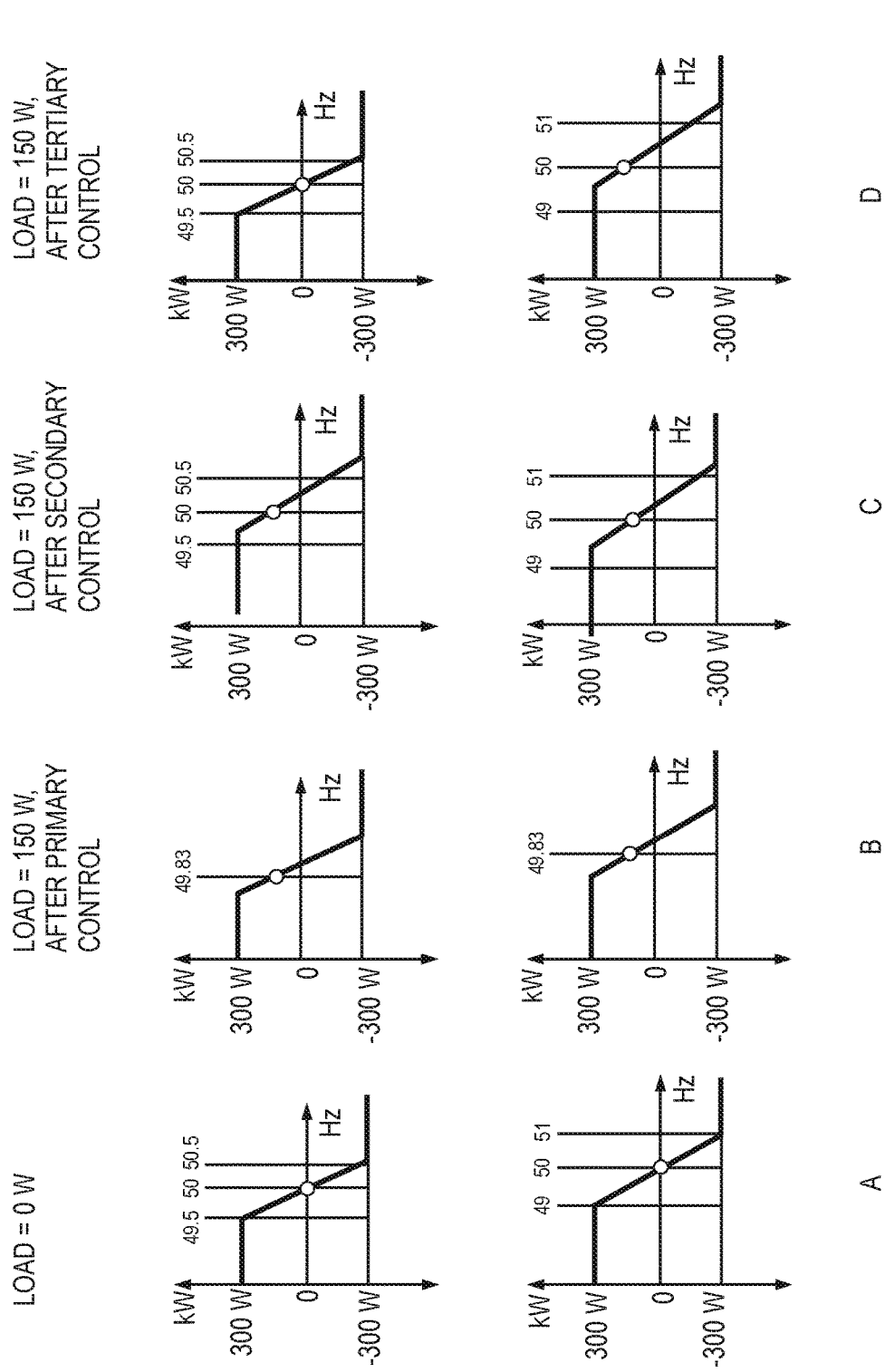
FIG. 6 is a graphical representation depicting impact of different control actions, such as primary, secondary and tertiary control actions that are performed by the central control unit for performing droop control in a power conversion unit, in accordance with an embodiment of the present disclosure.

FIG. 6 is a graphical representation 600 depicting impact of different control actions, such as primary, secondary and tertiary control actions that are performed by a central control unit (e.g., the central control unit 320) for performing droop control in a power conversion unit (PCU), such as the AC-DC PCU 304, in accordance with an example embodiment. In general, voltage droop is determined to be an intentional loss in the output voltage from a device, such as the gateway AC battery 204a and the expansion AC battery 204b as it drives a load (e.g., the electrical outlets 218). In addition, the voltage regulation can be maximized for load transients based on the information related to the voltage droop associated with the gateway AC battery 204a and the expansion AC battery 204b.

In one scenario, when the PCU (e.g., the AC-DC PCUs 304 and 324) is not connected to any load i.e. the load is zero as shown in a graph 'A' of FIG. 6, there will be no voltage droop. In other words, the electrical power supply system 202 does not provide power to any loads, thus resulting the voltage droop in the electrical power supply system 202 to be null.

In another scenario, when the PCU is connected to a load, such as 150 W as shown in a graph 'B' of the FIG. 6, a certain amount of active and reactive current $[I_a, I_r]$ is drawn from the AC-DC PCU 304 and 324 of the gateway AC battery 204a and the expansion AC battery 204b respectively. In this case, the voltage droop occurs due to power supply to the loads. More specifically, the terminal voltage and frequency of the AC-DC PCU 304 and 324 result in a droop due to power supply to the load. The droop caused in the terminal voltage and the frequency is due to the voltage supply to the load, the operating frequency for powering the load, current delivered by the AC-DC PCU for supplying to the load, the remote power system 217 or to any other AC-DC PCU. As a result, the voltage supply to the load or the terminal voltage is based on the amount of active and reactive current drawn by the AC-DC PCUs 304 and 324. Thus, the terminal voltage and frequency will droop according to the following expression:

$$\begin{bmatrix} \Delta F \\ \Delta V \end{bmatrix} = G \begin{bmatrix} I_a \\ I_r \end{bmatrix}$$

Where the matrix G is the 2×2 governing matrix and $$\begin{bmatrix} \Delta F \\ \Delta V \end{bmatrix} = \begin{bmatrix} F - F_0 + F_b \\ V - V_0 + V_b \end{bmatrix}$$

Where, F and V represent measured frequency and voltage, $F_0$ and $V_0$ represent nominal frequency and voltage and $F_b$ and $V_b$ represent frequency and voltage biases. Further, the frequency and voltage biases are the sum of a secondary and a tertiary terms. For example, the frequency bias from the secondary control may be '0.2' Hertz and the bias from the tertiary control may be '−0.1' Hertz. In this case, the resultant frequency bias $F_b$ will be the difference of the frequency bias from the secondary control and the tertiary control. Thus, the frequency bias $F_b$ would be a value of '0.1' Hertz.

In an embodiment, when multiple PCUs (e.g., the AC-DC PCUs 304 and 324) are connected in parallel, they converge to a common voltage and frequency such that the sum of active and reactive current equals the amounts provided or consumed by the power load.

In an embodiment, the secondary control action is performed by the central control unit when the electrical power supply system 202 provides the power to the customer location while being disconnected from the power grid, such as the power grid 110. After the secondary control action is performed, secondary components of the frequency and voltage bias of all the PCUs are updated simultaneously in order to reduce the deviation from the nominal frequency and voltage. As we can see in the graph 'C' of the FIG. 6, deviation from the nominal frequency and voltage is reduced.

In another embodiment, the secondary control action is performed by the central control unit when the electrical power supply system 202 provides the power to the customer location using the electrical power received from the power grid 110. After the secondary control action is performed, an error with respect to the target active and reactive current flowing to the external grid is reduced, at the expense of a larger frequency and voltage error.

In addition, the central control unit performs the tertiary control action to allocate relative contributions to active and reactive power by individual inverters. For example, if a battery A is more charged than a battery B, the central control unit will write a positive tertiary bias in the battery A and a negative tertiary bias in the battery B. Managing the biasing of the batteries associated with the electrical power supply system 202 results in controlling droop in the voltage and frequency as shown in a graph 'D' of the FIG. 6. Further, the electric power to be exchanged with the remote power system 217 is determined by the central control unit based on performing the tertiary control action.

Figure 7:
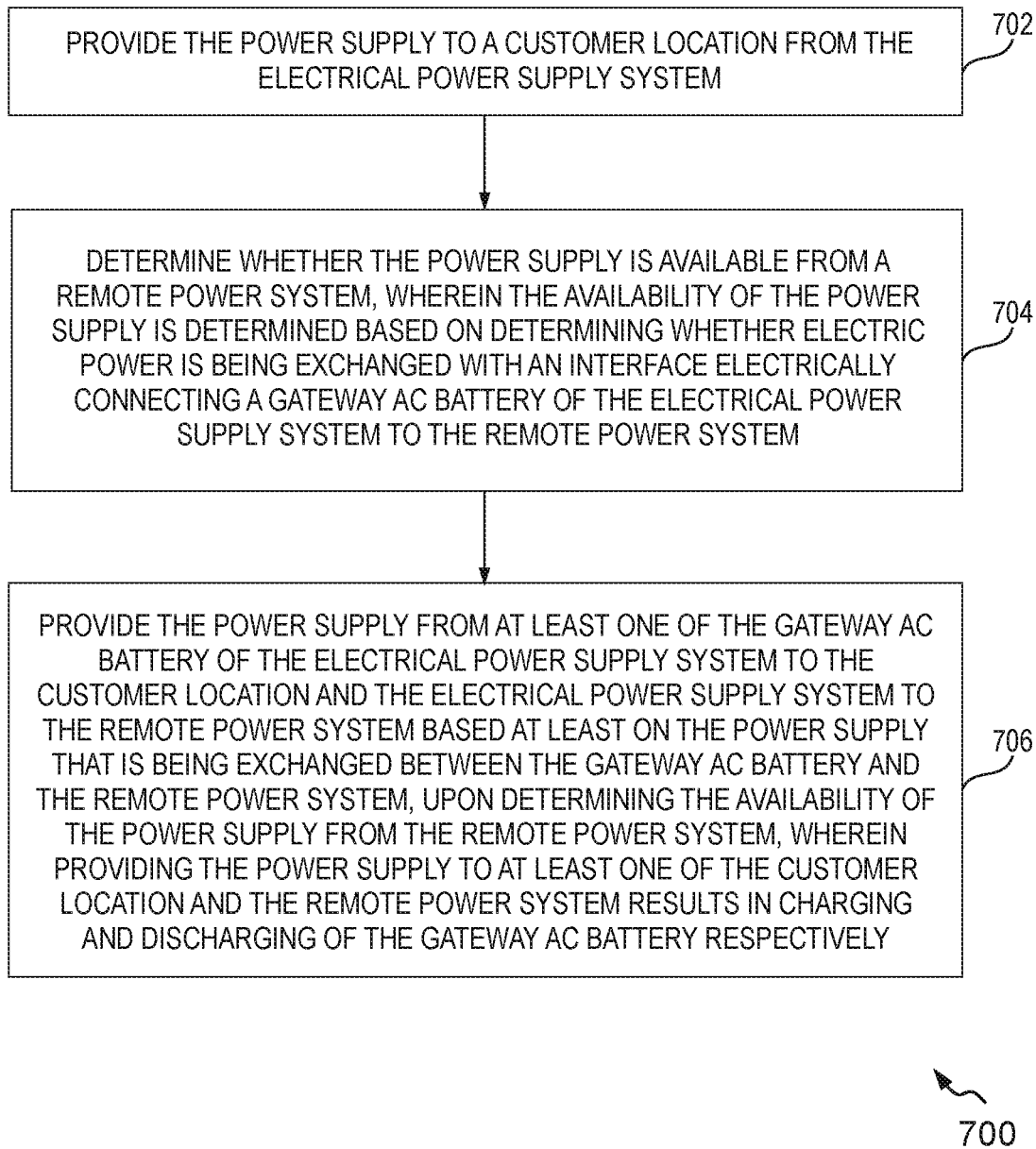
FIG. 7 is a flowchart depicting a method for providing electric energy production and storage, in accordance with an embodiment of the present disclosure.

FIG. 7 is a flowchart depicting a method 700 for providing electric energy production and storage, in accordance with an example embodiment of the present disclosure. The method 700 depicted in the flowchart may be executed by a central control unit (e.g. the central control unit 320). Operations of the method 700 and combinations of operation in the flow diagram, may be implemented by, for example, hardware, firmware, a processor, circuitry and/or a different device associated with the execution of software that includes one or more computed program instructions. The method 700 starts at operation 702.

At operation 702, the central control unit is configured to provide the power supply to a customer location (e.g., the customer location 102a) from the electrical power supply system (e.g., the electrical power supply system 202). In this scenario, the electrical power supply system 202 is used as a primary source of the power supply at the customer location 102a, that can make use of the remote power system 217 based on its availability.

At operation 704, the central control unit determines whether the power supply is available from a remote power system (e.g., the remote power system 217). The availability of the power supply is determined based on determining whether electric power is being exchanged with an interface (e.g., the interface 216) electrically connecting a gateway AC battery (e.g., the gateway AC battery 204a) of the electrical power supply system to the remote power system.

At operation 706, the central control unit is configured for providing the power supply from at least one of the gateway AC battery of the electrical power supply system to the customer location and the electrical power supply system to the remote power system based at least on the power supply that is being exchanged between the gateway AC battery and the remote power system. The central control unit provides the power supply to at least one of the customer location and the remote power system, upon determining the availability of the power supply from the remote power system. Providing the power supply to at least one of the customer location and the remote power system results in charging and discharging of the gateway AC battery respectively. Further, the operations 702-706 performed by the central control unit 320, for providing the power supply to the customer location from electrical power supply system 202 and from the electrical power supply system 202 to the remote power system 217 are already described in detail in description pertaining to FIG. 2 and FIGS. 3A-3B.

Additionally, the at least one AC-DC power conditioning unit (PCU) (e.g., the AC-DC PCU 304) of the gateway AC battery operates to maintain uninterrupted power supply from the gateway AC battery to the customer location. The central control unit is configured to operate the AC-DC PCU of the gateway AC battery based on the power availability at the AC bus bar, SoC of the battery, fitness condition and the like as explained above.

The gateway AC battery further includes a circuit breaker electrically connected between a power exchanging port of the gateway AC battery and the interface. The central control unit is configured to operate the circuit breaker in a disconnected state and a connected state based on determining the availability of the power supply from the remote power system. The circuit breaker operates to the disconnected state and the connected state based on receipt of a connect signal from the central control unit. Further, the central control unit is configured to monitor one or more parameters of the power supply that is being exchanged between the gateway AC battery and the remote power system for continuing exchange of the power supply with the remote power system, upon determining the availability of the power supply from the remote power system. The one or more parameters of the power supply includes at least one of a voltage amplitude, frequency, and phase angle. The central control unit transmits the connect signal to the circuit breaker, if each parameter of the one or more parameters of the power supply is determined to be within a safe limit defined for the corresponding parameter. The connect signal operates the circuit breaker to the connected state to continue exchange of the power supply with the remote power system. The central control unit discontinues sending of the connect signal to the circuit breaker, if any parameter of the one or more parameters of the power supply are determined not to be within a safe limit defined for the corresponding parameter. The absence of the connect signal operates the circuit breaker to the disconnected state from the connected state to discontinue the exchange of power supply with the remote power system. The description pertaining to the operation of the circuit breaker electrically connected to the power exchanging port and the AC-DC PCU by the central control unit based on monitoring the power supply from the electricity transmission lines is already described in detail in descriptions pertaining to FIGS. 2, 3A and 3B, and is not reiterated in this section for the sake of brevity.

Figure 8:
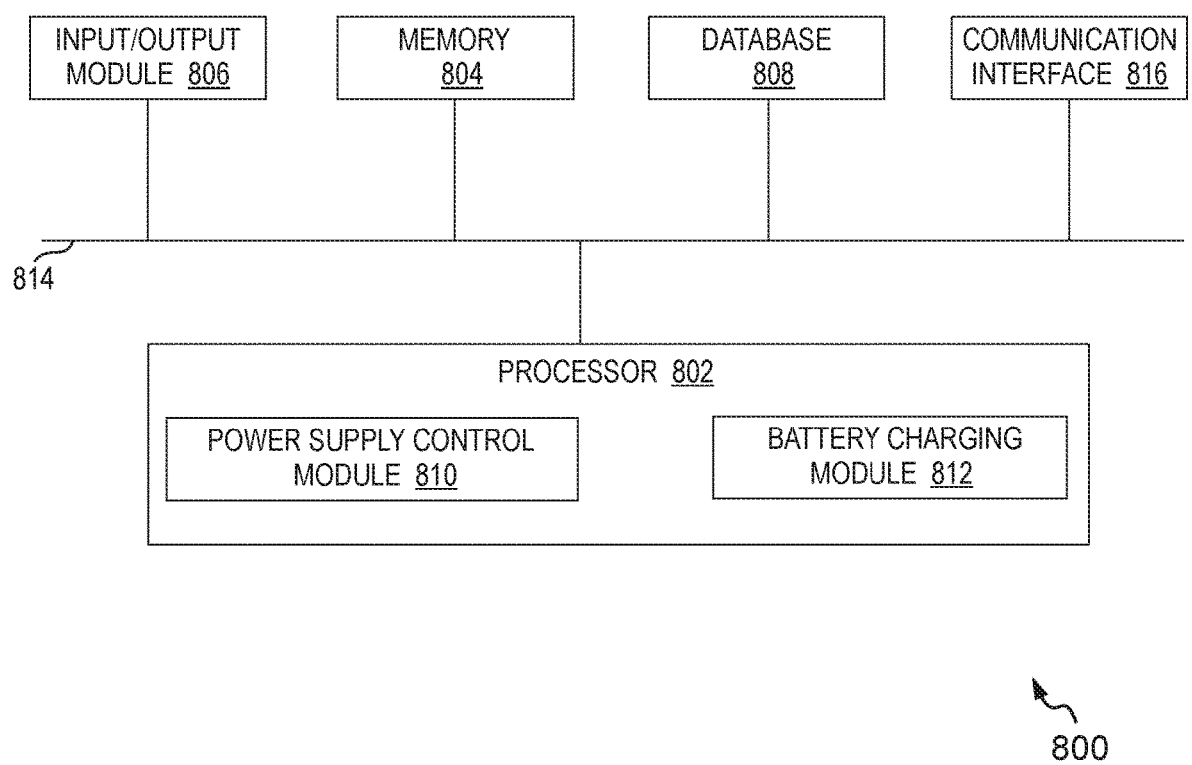
FIG. 8 is a block diagram representation of the central control unit of the gateway AC battery of the electrical power supply system of FIG. 2, in accordance with an example embodiment of the present disclosure.

FIG. 8 is a block diagram representation of a central control unit 800 similar to the central control unit 320 as shown in FIGS. 3A-3B. The central control unit 800 is configured to operate a system such as, the electrical power supply system 202 as shown in FIG. 2. The central control unit 800 includes various processing modules for operating the electrical power supply system 202. The processing modules described herein may be implemented by a combination of hardware, software, and firmware components.

The central control unit 800 includes a processor 802, a memory 804, an input/output module 806, and a database 808. The one or more components of the central control unit 800 communicate with each other via a bus 814. The processor 802 includes a power supply control module 810 and a battery charging module 812. It is noted that although the central control unit 800 is depicted to include only one processor 802, the central control unit 800 may include a number of processors. Moreover, it shall be noted that the components are shown for exemplary purposes and the central control unit 800 may include fewer or additional modules than those depicted in FIG. 8.

In an embodiment, the memory 804 is capable of storing machine-executable instructions. Further, the processor 802 is capable of executing the machine executable instructions to perform the functions described herein. The processor 802 embodies or is in communication with the components, such as the power supply control module 810 and the battery charging module 812. In an embodiment, the processor 802 may be embodied as a multi-core processor, a single core processor, or a combination of one or more multi-core processors and one or more single core processors. For example, the processor 802 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 802 may be configured to execute hard coded functionality. In an embodiment, the processor 802 is embodied as an executor of software instructions, wherein the instructions may specifically configure the processor 802 to perform the algorithms and/or operations described herein when the instructions are executed.

The memory 804 may be embodied as one or more volatile memory devices, one or more non-volatile memory devices, and/or a combination of one or more volatile memory devices and non-volatile memory devices. For example, the memory 804 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash memory, RAM (random access memory), etc.).

In an embodiment, the input/output module 806 may include mechanisms configured to receive input signals, such as the software updates from a server system using radio signals and also to provide output signal such as the signal to the AC-DC PCUs 304 and 324, and the connect signal to the circuit breaker 314. To that effect, the input/output module 806 may include at least one input interface and/or at least one output interface. Further, the input signal or the output signal is received or transmitted respectively, via a communication interface 816 of the central control unit 800.

The central control unit 800 includes the database 808 configured for storing information pertaining to the electrical power supply system 202. The database 808 may also be configured to store the information pertaining to the energy consumption data from the electricity transmission lines 226, and the like.

The module 412 may be configured to control the power supply from the electrical power supply system 202. The module 412 is configured to monitor the power supply from the electricity transmission lines 226 to exchange power with the AC batteries 204a and 204b for supplying power to the user location 106. More specifically, the module 412 may stop sending the connect signal to the circuit breaker 314, if the power supply from the electricity transmission lines 226 is determined to be not available. The module 412 may be configured to provide the signals or commands to the control unit 332 to at least operate the AC-DC PCU 324 of the expansion AC battery 204b based on SoC. Further, the module 412 may be configured to provide the connect signal to the circuit breaker 314, if the power supply from the electricity transmission lines 226 is available. The module 412 connects the transmission lines 226 based on monitoring the one or more parameters of the power supply. Further, the central control unit 800 may be configured to perform one or more operations as described above for providing power supply to the user location 102-102c. Furthermore, the central control unit 800 may be configured to perform one or more operations as described above where only the gateway AC battery included in the electrical power supply system for providing power supply to the user location 102-102c.

The battery charging module 812 is configured to communicate with the control unit 334 of the expansion AC battery 204b to determine fitness of the expansion AC battery 204b. The module 812 is also configured to enable or disable charge on the gateway AC battery 204a based on the fitness of the gateway AC battery 204a using at least one of power received from the remote power system 217 and the PV energy obtained from the PV panels 206.

Figure 9:
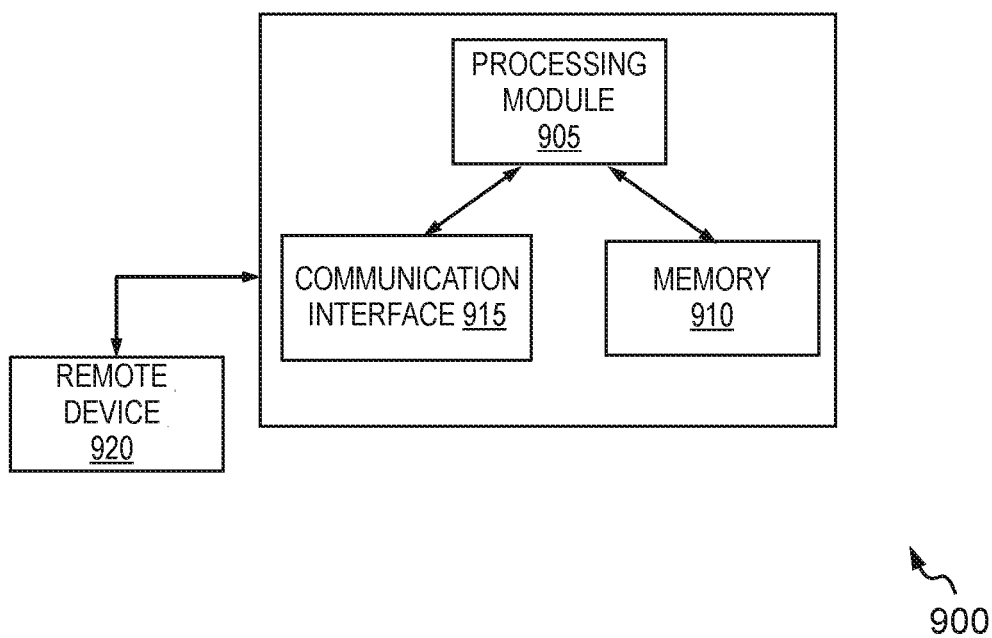
FIG. 9 is a block diagram of a control unit of at least one expansion AC battery of the electrical power supply system of FIG. 2, in accordance with one embodiment of the present disclosure.

FIG. 9 is a simplified block diagram of a control unit 900 of at least one expansion AC battery, such as the at least one expansion AC battery 204b of FIG. 2, in accordance with one embodiment of the present disclosure. The control unit 900 is an example of the control unit 334 of FIG. 2. The control unit 900 includes a processing module 905 configured to extract programming instructions from a memory 910 to provide various features of the present disclosure. The components of the control unit 900 provided herein may not be exhaustive and the control unit 900 may include more or fewer components than those depicted in FIG. 9. Further, two or more components may be embodied in one single component, and/or one component may be configured using multiple sub-components to achieve the desired functionalities. Some components of the control unit 900 may be configured using hardware elements, software elements, firmware elements and/or a combination thereof.

Via a communication interface 915, the processing module 905 receives information from a remote device 920 such as, the central control unit 800. The control unit 900 may be configured to charge the battery of the at least one expansion AC battery based on the SoC of the expansion AC battery or based on receipt of a control signal from the central control unit 800. Further, the control unit 900 may be configured to control the power distribution from the expansion AC battery to the user location 102-102c based on commands received by the control unit 900. Furthermore, the control unit 900 is configured to activate the AC-DC PCU of the expansion AC battery to provide power supply. The control unit 900 activates the AC-DC PCU based on the SoC of the battery and the safety considerations. Further, the control unit 900 is configured to communicate the telemetry of the expansion AC battery 204b to the central control unit 800 for power allocation as explained with reference to FIGS. 4A-4B. In one embodiment, the control unit 900 may also perform similar operations as performed by the central control unit 800 or the central control unit 320.

The disclosed methods with reference to FIG. 1 to 9, or one or more operations of the flow diagrams 400 and 500 and the flowchart method 700 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components)) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means includes, for example, the Internet, the World Wide Web, an intranet, software applications, cable (including fiber optic cable), magnetic communications, electromagnetic communications (including RF, microwave, and infrared communications), mobile communications, or other such communication means.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. An electrical power supply system for providing electric energy production and storage, the system comprising:
a gateway alternating current (AC) battery comprising a central control unit configured to at least:
provide the power supply to a customer location from the electrical power supply system,
determine whether the power supply is available from a remote power system, wherein the availability of the power supply is determined based on determining whether electric power is being exchanged with an interface electrically connecting the gateway AC battery to the remote power system, and
upon determining the availability of the power supply from the remote power system, provide the power supply from at least one of the gateway AC battery of the electrical power supply system to the customer location and the electrical power supply system to the remote power system based at least on the power supply that is being exchanged between the gateway AC battery and the remote power system, wherein providing the power supply to at least one of the customer location and the remote power system results in charging and discharging of the gateway AC battery respectively.

2. The system as claimed in claim 1, wherein at least one AC-DC power conditioning unit (PCU) of the gateway AC battery operates to maintain uninterrupted power supply from the gateway AC battery to the customer location.

3. The system as claimed in claim 1, wherein the gateway AC battery further comprises a circuit breaker electrically connected between a power exchanging port of the gateway AC battery and the interface, wherein the central control unit is configured to operate the circuit breaker in a disconnected state and a connected state based on determining the availability of the power supply from the remote power system, wherein the circuit breaker operates to the disconnected state and the connected state based on receipt of a connect signal from the central control unit.

4. The system as claimed in claim 3, wherein for charging the gateway AC battery, the central control unit is further configured to:
monitor one or more parameters of the power supply that is being exchanged between the gateway AC battery and the remote power system for continuing exchange of the power supply with the remote power system, upon determining the availability of the power supply from the remote power system.

5. The system as claimed in claim 4, wherein the one or more parameters of the power supply include voltage amplitude, frequency, and phase angle.

6. The system as claimed in claim 5, wherein the central control unit is further configured to transmit the connect signal to the circuit breaker if each parameter of the one or more parameters of the power supply is determined to be within a safe limit defined for the corresponding parameter, wherein the connect signal operates the circuit breaker to the connected state to continue exchange of the power supply with the remote power system.

7. The system as claimed in claim 5, wherein the central control unit is further configured to discontinue sending of the connect signal to the circuit breaker if any parameter of the one or more parameters of the power supply are determined not to be within a safe limit defined for the corresponding parameter, wherein the absence of the connect signal operates the circuit breaker to the disconnected state from the connected state to discontinue the exchange of power supply with the remote power system.

8. A method performed by a central control unit of an electrical power supply system for providing electric energy production and storage, the method comprising:
providing the power supply to a customer location from the electrical power supply system;
determining whether the power supply is available from a remote power system, wherein the availability of the power supply is determined based on determining whether electric power is being exchanged with an interface electrically connecting a gateway AC battery of the electrical power supply system to the remote power system; and
upon determining the availability of the power supply from the remote power system, providing the power supply from at least one of the gateway AC battery of the electrical power supply system to the customer location and the electrical power supply system to the remote power system based at least on the power supply that is being exchanged between the gateway AC battery and the remote power system, wherein providing the power supply to at least one of the customer location and the remote power system results in charging and discharging of the gateway AC battery respectively.

9. The method as claimed in claim 8, wherein at least one AC-DC power conditioning unit (PCU) of the gateway AC battery operates to maintain uninterrupted power supply from the gateway AC battery to the customer location.

10. The method as claimed in claim 8, wherein the gateway AC battery further comprises a circuit breaker electrically connected between a power exchanging port of the gateway AC battery and the interface, wherein the central control unit is configured to operate the circuit breaker in a disconnected state and a connected state based on determining the availability of the power supply from the remote power system, wherein the circuit breaker operates to the disconnected state and the connected state based on receipt of a connect signal from the central control unit.

11. The method as claimed in claim 10, wherein charging the gateway AC battery comprises: monitoring one or more parameters of the power supply that is being exchanged between the gateway AC battery and the remote power system for continuing exchange of the power supply with the remote power system, upon determining the availability of the power supply from the remote power system.

12. The method as claimed in claim 11, wherein the one or more parameters of the power supply include voltage amplitude, frequency, and phase angle.

13. The method as claimed in claim 12, further comprising:
transmitting the connect signal to the circuit breaker if each parameter of the one or more parameters of the power supply is determined to be within a safe limit defined for the corresponding parameter, wherein the connect signal operates the circuit breaker to the connected state to continue exchange of the power supply with the remote power system.

14. The method as claimed in claim 12, further comprising:
discontinuing sending of the connect signal to the circuit breaker if any parameter of the one or more parameters of the power supply are determined not to be within a safe limit defined for the corresponding parameter, wherein the absence of the connect signal operates the circuit breaker to the disconnected state from the connected state to discontinue the exchange of power supply with the remote power system.

15. An electrical power supply system for providing electric energy production and storage, the system comprising:
a gateway alternating current (AC) battery;
at least one expansion AC battery;
an interface for electrically connecting the gateway AC battery to a remote power system;
an expansion port provided in the gateway AC battery for electrically connecting the gateway AC battery, the at least one expansion AC battery and a plurality of photovoltaic (PV) panels; and
a central control unit provided in the gateway AC battery, the central control unit configured to at least:
provide the power supply to a customer location from the electrical power supply system, wherein the electrical power supply system provides the power supply to the customer location using at least one of PV energy generated by the plurality of PV panels and energy stored in the gateway AC battery and the at least one expansion AC battery, determine whether the power supply is available from the remote power system, wherein the availability of the power supply is determined based on determining whether electric power is being exchanged with the interface, upon determining the availability of the power supply from the remote power system, provide the power supply from at least one of the electrical power supply system to the customer location and the electrical power supply system to the remote power system based at least on the power supply that is being exchanged between the electrical power supply system and the remote power system, wherein providing the power supply to at least one of the customer location and the remote power system results in charging and discharging of the gateway AC battery and the at least one expansion AC battery of the electrical power supply system respectively.

16. The system as claimed in claim 15, wherein at least one AC-DC power conditioning unit (PCU) of the plurality of PV panels, the gateway AC battery and the at least one expansion AC battery operates to maintain uninterrupted power supply from the gateway AC battery to the customer location.

17. The system as claimed in claim 15, wherein the gateway AC battery further comprises a circuit breaker electrically connected between a power exchanging port of the gateway AC battery and the interface, wherein the central control unit is configured to operate the circuit breaker in a disconnected state and a connected state based on determining the availability of the power supply from the remote power system, wherein the circuit breaker operates to the disconnected state and the connected state based on receipt of a connect signal from the central control unit.

18. The system as claimed in claim 17, for charging the gateway AC battery and the at least one expansion AC battery, the central control unit is further configured to:

monitor one or more parameters of the power supply that is being exchanged between the gateway AC battery and the remote power system for continuing exchange of the power supply with the remote power system, upon determining the availability of the power supply from the remote power system, wherein the one or more parameters of the power supply include voltage amplitude, frequency, and phase angle.

19. The system as claimed in claim 18, wherein the central control unit is further configured to transmit the connect signal to the circuit breaker if each parameter of the one or more parameters of the power supply is determined to be within a safe limit defined for the corresponding parameter, wherein the connect signal operates the circuit breaker to the connected state to continue exchange of the power supply with the remote power system.

20. The system as claimed in claim 18, wherein the central control unit is further configured to discontinue sending of the connect signal to the circuit breaker if any parameter of the one or more parameters of the power supply are determined not to be within a safe limit defined for the corresponding parameter, wherein the absence of the connect signal operates the circuit breaker to the disconnected state from the connected state to discontinue the exchange of power supply with the remote power system.

* * * * *